Dec. 30, 1930.  G. M. HARRY ET AL  1,786,749
OPERATING MECHANISM FOR CLUTCH AND BRAKE BANDS
Filed Sept. 8, 1927
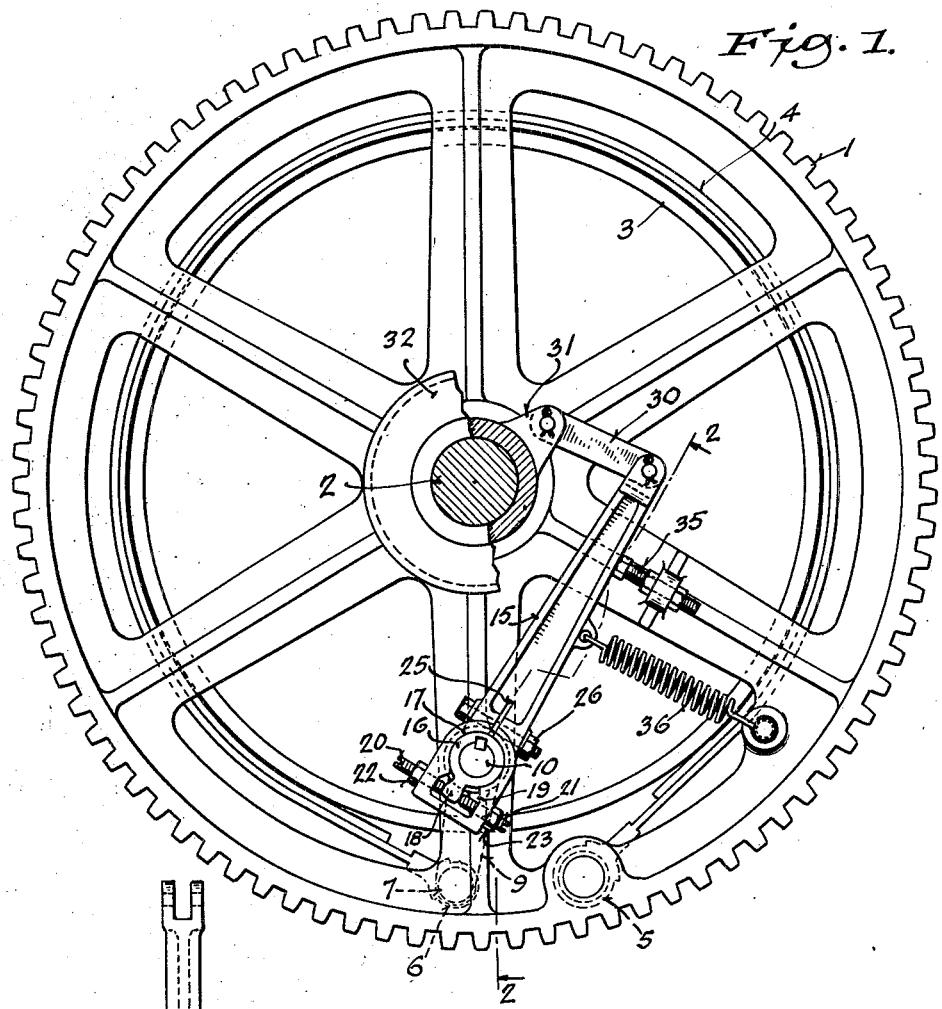
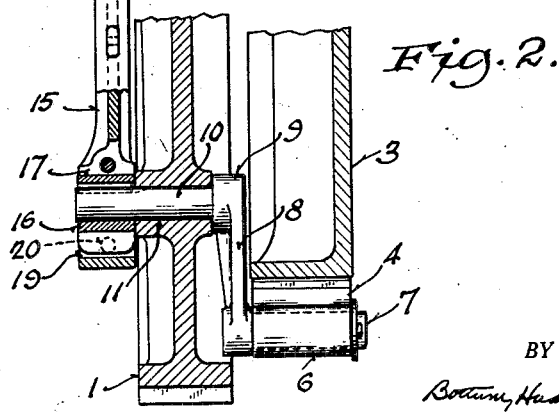
INVENTOR.
GEOFFREY M. HARRY
AND CHARLES STERNBERGER
BY
ATTORNEYS.

Patented Dec. 30, 1930

1,786,749

UNITED STATES PATENT OFFICE

GEOFFREY M. HARRY, OF MILWAUKEE, AND CHARLES STERNBERGER, OF WEST ALLIS, WISCONSIN, ASSIGNORS TO HARNISCHFEGER CORPORATION, OF MILWAUKEE, WISCONSIN, A CORPORATION OF WISCONSIN

OPERATING MECHANISM FOR CLUTCH AND BRAKE BANDS

Application filed September 8, 1927. Serial No. 218,133.

This invention relates to an improved adjusting mechanism for the bands of clutches or brakes.

One object of the invention is to provide mechanism of this character which may be readily and easily adjusted to take up or loosen the band, as may be desirable.

Another object is to provide a device of this character wherein the adjustment may be made without taking down or disassembling the parts and in which the adjustment, when made, is positively maintained until the facing of the band has been so worn as to necessitate further adjustment.

A further object is to provide a device of this character which is especially adapted for use with the clutch bands of excavating machinery, although also adapted for practically universal application.

Other objects and advantages reside in certain novel features of the construction, arrangement and combination of parts, which will be hereinafter more fully described and particularly pointed out in the appended claims, reference being had to the accompanying drawing, forming a part of this application and in which:

Figure 1 is a view in side elevation showing the invention applied to the clutch band of a drum of an excavating machine.

Figure 2 is a fragmentary sectional view on line 2—2 of Figure 1.

While the invention may be used with advantage in various diverse types of machines, some of the elements are capable of practically universal application. These have for the sake of example and illustration only, been shown applied in connection with the clutch band of an excavating machine. This type of machine is widely known and used in the art. The patent to L. Wehner, No. 1,570,108, granted June 19, 1926, is illustrative of one type of such machine. Another type is shown in the co-pending application of Arthur G. Henricks for transmission mechanism, Serial No. 164,696, filed January 31, 1927. Still another type is shown in the patent to King, et al., No. 558,691, granted April 21, 1896, for friction clutches.

For the purposes of the present invention, it is sufficient to bear in mind that these machines comprise a constantly driven gear loosely mounted on a shaft 2 adjacent a drum 3 also mounted on the shaft 2. The drum 3 is loose on the shaft 2 but may be clutched to the gear 1 to rotate therewith under the influence of a clutch band 4. One end of the clutch band 4 is dead-ended on or fixed to the gear wheel 1 as at 5. The opposite end of the clutch band 4 has a sleeve 6 fixed thereto and into this sleeve a crank pin 7 is operatively fitted and suitably held against displacement, the crank pin 7 being fixed to the outer end of and projecting laterally from the crank arm 8 of a crank designated generally at 9. The crank 9 also has a shaft 10 which is fitted in a bearing 11 provided therefor in the gear wheel 1. The shaft 10 projects beyond the outer face of the gear wheel as shown in the drawing.

For the purpose of swinging this crank 9 and thereby controlling and effecting the tightening and loosening of the clutch band 4, an operating lever designated generally at 15 is provided and has an adjustable connection with the shaft 10 of the crank 9. To effect the mounting and adjustable connection of the lever 15 on and with the shaft 10 of the crank 9, the shaft 10 has a collar 16 fitted on and keyed to the projecting portion thereof. The lever has a bearing 17 formed adjacent one end thereof and in this bearing 17 the collar 16 is a working fit. The collar 16 is provided with a projection or abutment 18 which extends into an opening 19 formed in the lever 15 below the bearing 17 thereof. Adjusting screws 20 and 21 are threadedly connected with the lower end of the lever and project into the opening 19 and are engageable with the opposite sides of the abutment 18 of the collar. Lock nuts 22 and 23 are provided for securing screws 20 and 21 in adjusted position. Above its bearing 17 the lever 15 is split as at 25 and with this split portion a clamping nut and bolt arrangement 26 co-acts. As the lever 15 is constructed of metal having some resiliency, the clamping nut and bolt arrangement 26 may be tightened up to clamp the bearing portion 17 of the lever on the collar 16.

The lever 15 may be actuated in any suitable manner. As shown it is connected by a link 30 with a lug 31 fixed on a clutch band control drum 32 which may be governed in its action in any convenient manner, or as illustrated in the Henrick's application or King patent hereinabove referred to.

When the clutch lever 15 is released it is urged against adjustable abutment 35 under the influence of a retractible coil spring 36 having one end connected with the lever and its other anchored on the gear wheel 1. This spring 36 and the abutment 35 co-act to maintain the lever 15 in a fixed and definite position while leaving it free or capable of being adjusted under the action of its control mechanism.

To take up or tighten the clutch band 4, the clamp nut and bolt arrangement 26 is loosened, lock nuts 22 and 23 are backed off and the screw 21 is turned to disengage it from the abutment 18. Then the screw 20 is turned to advance this screw inwardly and push or force the abutment or projection 18 in a counter-clockwise direction as viewed in Figure 1. This also swings the crank 9 in a counter-clockwise direction as viewed in Figure 1 and tightens the clutch band 4 against its drum 3. When the desired adjustment is had, the screw 21 and the lock nuts 22 and 23 are tightened up and the clamping bolt and nut arrangement 26 is also tightened up. Thus the adjustment is positively and certainly maintained. It is to be noted that when the screw 20 is being advanced inwardly to swing the crank and thus take up the clutch band, the lever 15 is effectively held by the action of the spring 36 and abutment 35. Reverse manipulation of the screws 20 and 21 operates to loosen the clutch band.

It is to be noted that this adjustment is made without varying the relation between the crank 9, the band 4 and the gear wheel 1 but is made in the actuating mechanism for the crank 9. With this construction the diameters of the gear 1 and drum 3 may be made very nearly equal, it being necessary to leave only sufficient space between the peripheries of these elements to accommodate the eyes on the ends of the band.

While the invention has been shown in connection with one type of clutch band, it is to be understood that it may be used with various types of brake bands and other types of clutch bands with equal advantage.

The invention claimed is:

1. A power clutch comprising a drum adapted to be driven, a rotary driving member therefor, a clutch band cooperable with said drum and having one end anchored on said driving member, a crank mounted on said driving member and engaged with the other end of said band, operating mechanism for the crank including a control drum, an operating lever for the crank, mechanical linkage interposed between the operating lever and the control drum and utilizing the initial relative movement between the driving member and the control drum to quickly impart operating movement to the operating lever, means cooperating with the operating lever to constrain it to partake of movement through its operating positions only, and adjustable fastening means between the operating lever and the crank and providing, in its secured position, a positive connection between the lever and the crank but adjustable to shift the crank relative to the lever while leaving the lever stationary and in proper operative relation relative to the mechanical linkage.

2. In combination, a shaft, a gear wheel thereon, a cable drum mounted for rotation relative to the gear wheel, a band surrounding said drum and having eyes permanently secured to its ends and symmetrical with respect to the circumferential axis of the band, a pin on the gear wheel adapted to cooperate with one of said eyes for dead-ending one end of the band on the gear wheel, a crank pivotally mounted on the gear wheel and having a pin engaged with the other of said eyes for contracting the band into engagement with said cable drum upon movement of the crank, a control drum loosely mounted on said shaft, an operating member for the crank, mechanical linkage interposed between the operating member and the control drum and utilizing the initial relative movement between the gear wheel and the control drum to quickly impart operating movement to the operating member, means cooperating with the operating member to constrain it to partake of movement through its operating cycle only, and adjustable fastening means between the operating member and the crank and acting in its secured position to provide a positive connection between the operating member in the crank but adjustable to shift the crank relative to the operating member while leaving the operating member stationary and in proper operative relation to its mechanical linkage.

3. In a power clutch of the type having a crank for operating a clutch band and a control drum actuated lever for operating said crank, an adjustable connection between the lever and the crank acting in its secured position to provide a positive connection between the lever and the crank but operable when shifted to adjust the crank relative to the lever, and means for holding said lever against movement during adjustment of the crank relative thereto while permitting operative movement of the lever under the control of the control drum.

4. In a power clutch of the type having a crank for operating a clutch band and a control drum actuated lever for operating said crank, a projection on said crank, said lever having an opening receiving said projection, adjustable means on said lever engaging the projection to shift the crank relative to the lever and means for securing the lever in adjusted position on the crank.

5. In a power clutch of the type having a crank for operating a clutch band and a control drum actuated lever for operating said crank, a collar fixed to the crank and having a projection, said lever having a bearing portion fitted on said collar and having an opening receiving said projection, screws threadedly engaged with the lever and also engaging the projection, and means for securing the lever in adjusted position on the crank.

6. A power clutch comprising a drum adapted to be driven, a rotary driving member therefor, a clutch band cooperable with said drum and having one end anchored on said driving member, a crank mounted on said driving member and engaged with the other end of said band, operating mechanism for the crank including a control drum, an operating lever for the crank, a link connecting one end of the lever with the control drum whereby the initial relative movement between the driving member and the control drum quickly imparts operating movement to the operating lever, cooperating means between the driving member and the operating lever to constrain the operating lever to movement through its operating positions only, and adjustable means for shifting the crank relative to the operating lever and for securing the crank and lever together in any adjustment while leaving the lever stationary and in proper operative relation to its link and its control drum during adjustment of the crank.

In witness whereof we hereto affix our signatures.

GEOFFREY M. HARRY.
CHAS. STERNBERGER.